July 31, 1956  W. M. HARKS  2,756,715
MULTIPLE LEVEL INDICATOR FOR A TANK VARIETY VEHICLE
Original Filed Aug. 6, 1954  2 Sheets-Sheet 1
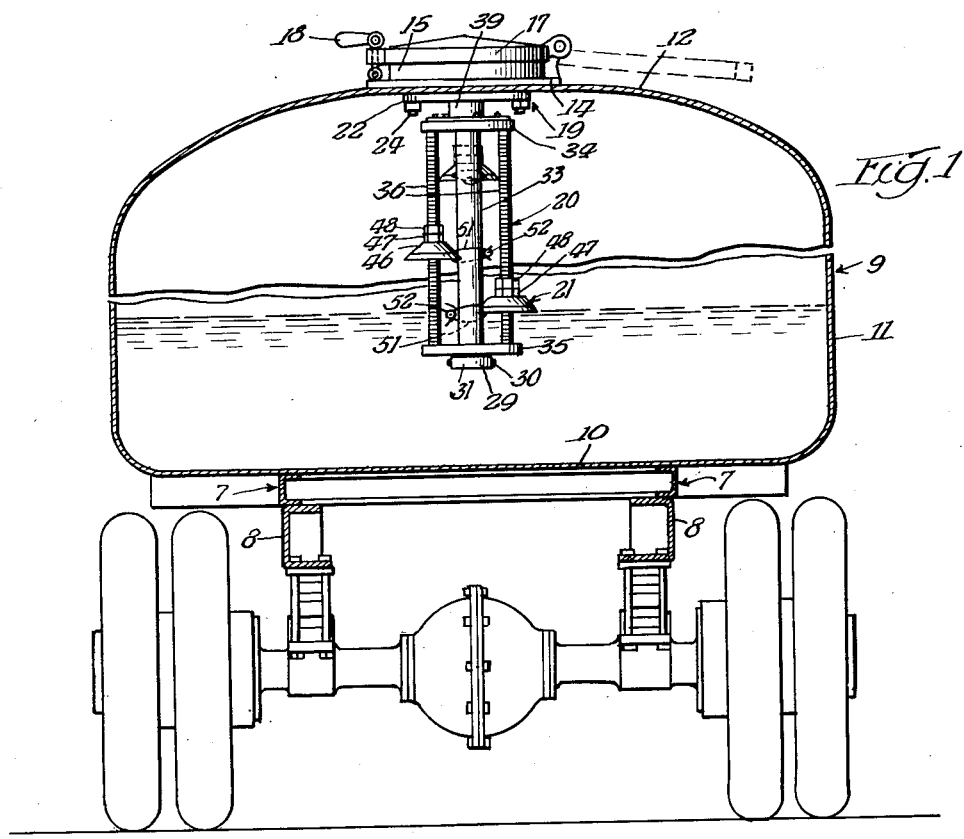
Inventor
Walter M. Harks
By: Fred Gerlach, atty.

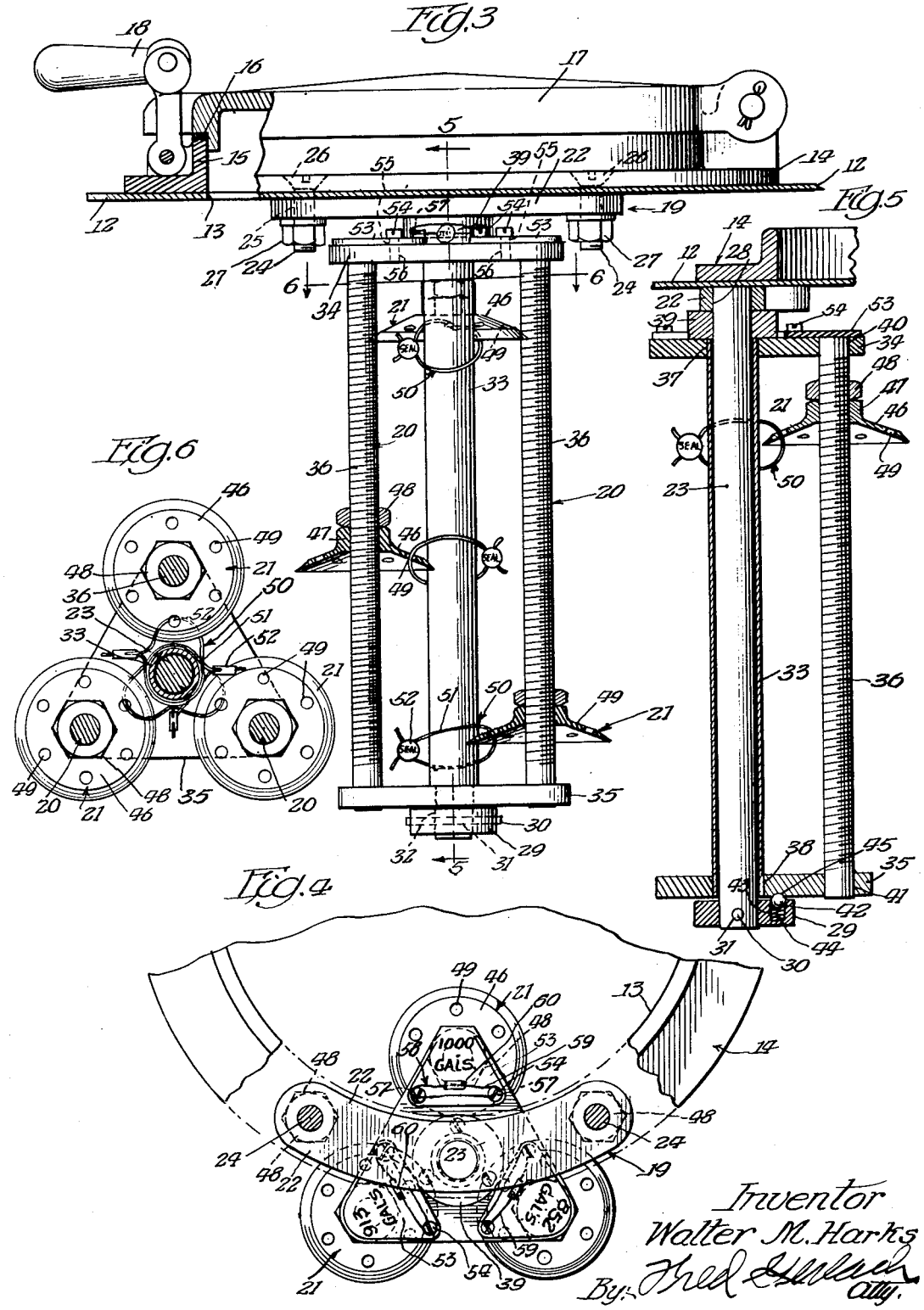

United States Patent Office 2,756,715
Patented July 31, 1956

2,756,715

MULTIPLE LEVEL INDICATOR FOR A TANK VARIETY VEHICLE

Walter M. Harks, Evanston, Ill.

Continuation of abandoned application Serial No. 448,324, August 6, 1954. This application March 9, 1955, Serial No. 493,221

21 Claims. (Cl. 116—118)

The present invention relates generally to indicators. More particularly, the invention relates to that type of indicator which is designed for use in the tank of a tank variety vehicle (truck or trailer) and serves to indicate the amount of liquid in the tank.

Because of the high cost of operation of a tank variety vehicle in connection with the transportation of a particular petroleum product such, for example, as gasoline, kerosene or fuel oil, it is desirable to load the tank of the vehicle to the greatest capacity permitted under the regulations which govern the axle weight load of the vehicle. A tank variety vehicle which is designed to operate only in intrastate commerce and to carry as its load gasoline will have the tank engineered or constructed to a size which permits the maximum tank quantity of gasoline to be carried or hauled without violation of the weight limits of the State in which the vehicle operates. In ordinary practice, the tank is provided with a single vertically adjustable marker which is set to indicate the level of the gasoline at full or maximum permissible load and after proper setting is sealed by an official of the department of weights and measures having jurisdiction of the vehicle. In some instances, however, it is desired to have the vehicle haul instead of gasoline a petroleum product of greater specific gravity than gasoline, such for example, as kerosene or fuel oil. In such instances, it is necessary, in order to avoid violation of the weight limits of the State in which the vehicle is designed to operate, to fill the tank to a lesser extent in order that the weight of the load of the other petroleum product will correspond to the weight of the load when the tank is filled to its full or maximum weight limit with gasoline. In other instances, it is desired that the vehicle carry but a single petroleum product and engage in interstate commerce. In such instances, the marker is ordinarily set and sealed in the State in which transportation commences. Many States have different weight axle load requirements and, therefore, the "full" tank capacity of the State of origination may be at variance with the "full" tank capacity of other States through which the vehicle travels. In order to cope with the instances heretofore mentioned, it has heretofore been proposed to employ a multiple level indicator consisting of a single screw threaded rod which is connected to, and depends from, the top of the tank of the vehicle, is located directly to one side of the usual cover-closed filler opening of the tank and has a plurality of vertically spaced nut type markers mounted thereon. When such an indicator is used on a tank variety vehicle which is engaged only in intrastate transportation and operates periodically or intermittently to haul different types or kinds of petroleum products, the markers are set or adjusted so that each is at the proper level to denote a full tank load of a particular petroleum product. In this connection it is contemplated that the highest marker will indicate the full load capacity of the tank when loaded with gasoline; the next lower marker will indicate the full capacity of the tank when loaded with gasoline; the next lower marker will indicate the full capacity of the tank when loaded with a petroleum product of higher specific gravity, such for example, as kerosene; the next lower marker will indicate the full capacity level when the tank is loaded with a petroleum product having a still higher specific gravity, such for example, as fuel oil; and so on, depending upon the number of types of petroleum products to be hauled by the vehicle. When such an indicator is used with a tank variety vehicle which is adapted to haul only one type or kind of a petroleum product but is employed in interstate transportation, the markers are set so as to indicate the different full load capacity levels for the States through which the vehicle travels. In this connection it is contemplated that the highest marker will indicate the full load capacity of the tank when the vehicle is traveling in a State having a high axle weight load; the next lower marker will indicate the maximum permissible tank capacity when the vehicle is travelling in a State the axle weight load requirements of which are less; and the next lower marker will indicate the maximum permissible tank capacity for a State having axle weight load regulations which are still lower. In practice, it has been found that a multiple level indicator of the character heretofore mentioned, i. e., an indicator consisting of a single vertically extending screw threaded rod and a plurality of nut type markers on the rod is subject to certain objections and is looked upon with marked disfavor by officials of various departments of weights and measures. In the first place, such an indicator is extremely difficult to read because the topmost marker obscures, or obstructs the view of, the lower markers when any of the latter are to be used. Secondly, difficulty is experienced in sealing the markers in place by the officials of the department of weights and measures having jurisdiction. Thirdly, the stacked or vertical series arrangement of the nut type markers does not lend itself to identification of the number of gallons each particular marker is intended to indicate.

The primary object of this invention is to provide a multiple level indicator which is an improvement upon, and eliminates the disadvantages of, previously designed indicators including the type of multiple type level indicator heretofore mentioned, and is characterized by the fact that the nut type markers instead of being mounted on a single screw threaded rod are mounted on individual screw threaded rods which are spaced laterally apart and permit ready viewing of the markers through the filling opening of the tank of the vehicle to which the indicator is applied when the cover for the opening is in its open position.

Another object of the invention is to provide a multiple level indicator of the type and character under consideration in which the laterally spaced vertically extending screw threaded rods form part of a frame which is mounted for rotation about a vertical axis to the end that it may be so turned or angularly adjusted as to bring the markers selectively into full view through the cover equipped filling opening of the tank of the vehicle.

Another object of the invention is to provide a multiple level indicator of the last mentioned character in which the rotatably mounted frame comprises a horizontally extending top plate at the upper ends of the rods and a horizontally extending bottom plate at the lower ends of the rods, and the top plate of the frame has over the upper end of each rod a soft metal plate which is capable of being sealed in place and is adapted to have stamped on it the number of gallons which are to be indicated by the subjacent nut type marker.

A further object of the invention is to provide a multiple level indicator of the heretofore mentioned type and character which includes a novel detent arrangement for frictionally but releasably holding the frame in the various positions into which it is rotated, and in addition simple and novel means for sealing each nut type marker in the position in which it is set by the official of the department of weights and measures having jurisdiction of the vehicle with which the indicator is employed.

A still further object of the invention is to provide a multiple level indicator which is generally of new and improved construction, involves a novel arrangement of parts, effectively and efficiently fulfills its intended purpose, and is so designed that it may be produced at a comparatively low cost as well as operated and adjusted with facility.

Other objects of the invention and the various advantages and characteristics of the present multiple level indicator will be apparent from a consideration of the following detailed description.

The invention consists in the several novel features which are hereinafter set forth and are more particularly defined by claims at the conclusion hereof.

In the drawings which accompany and form a part of the present specification or disclosure and in which like numerals of reference denote corresponding parts throughout the several views:

Figure 1 is a vertical transverse section of a tank variety vehicle having applied thereto a multiple level indicator embodying the invention;

Figure 2 is a fragmentary plan view of the tank of the vehicle showing the cover of the filling opening in its open position and illustrating how one of the nut type markers is fully visible through the filling opening;

Figure 3 is an enlarged side elevation of the indicator;

Figure 4 is a plan view of the indicator illustrating in detail the arrangement and manner of mounting of the quantity indicating plates which are mounted on the top plate of the rotatable frame in overlying relation with the upper ends of the laterally spaced vertically extending screw threaded rods;

Figure 5 is a vertical section taken on the line 5—5 of Figure 3 and showing in detail the manner in which the frame is rotatably mounted and also the design and construction of the detent arrangement for frictionally but releasably holding the frame in the various positions into which it is turned or angularly adjusted; and Figure 6 is a horizontal section taken on the line 6—6 of Figure 3 and illustrating the design and construction of the means for sealing the nut type markers after they have been properly set or adjusted on their respective screw threaded rods.

The indicator which is shown in the drawings constitutes the preferred form or embodiment of the invention. It is known in the art as a multiple level or capacity indicator and is designed and adapted primarily for use in connection with a tank variety vehicle 7. The latter embodies a wheel equipped chassis 8 and a tank 9 on the chassis. It is contemplated that the vehicle may be either a tank trunk or a tank trailer. The tank 9 of the vehicle 7 is designed to hold one particular petroleum product, such for example as gasoline or different petroleum products, such for example as gasoline, kerosene and fuel oil, depending upon the use to which the vehicle is put. It extends lengthwise of the vehicle chassis and consists of a bottom wall 10, a pair of side walls 11 and an arched or dome shaped top wall 12. The top wall of the tank is connected to, and extends between, the upper portions of the side walls 11 and has in its central portion a circular opening 13 by which the tank interior may be filled. The filling opening 13 is reenforced by a ring 14 which is welded or otherwise fixedly secured to the upper surface of the portion of the tank top wall 12 that defines the filling opening 13. The inner peripheral portion of the ring is provided with an integral upwardly extending annular flange 15, the upper margin of which is provided with a gasket 16. The filling opening 13 is normally closed by way of a circular cover 17 which is hinged at one portion thereof so that it is capable of swinging back and forth between a closed position wherein it rests on the gasket 16 and an open position wherein it exposes the filling opening. Diametrically opposite the hinge for the cover is a bolt and lever arrangement 18 for releasably clamping or locking the cover in its closed position.

The indicator is located in the interior of the tank 9 at a position or location at one side of the filling opening 13 and as its principal parts or components comprises a mounting structure 19, a vertically elongated rotatable frame 20 and a plurality of nut type markers 21.

The mounting structure 19 of the indicator consists of a horizontally extending arcuate bracket 22 and a vertically extending depending shaft 23. The bracket fits flatly against the superjacent part of the portion of the tank top wall that defines the filling opening 13, and is fixedly secured in place by means of a pair of vertically extending bolts 24. The latter extend through holes 25 in the ends of the bracket 22 and also registering holes in the superjacent parts of the tank top wall 12 and the reenforcing ring 14 and have heads 26 at the upper ends of their shanks. The lower ends of the shanks are provided with clamp nuts 27. The upper end of the shaft 13 fits in a circular hole 28 in the central portion of the arcuate bracket 22 and is secured in place by a drive or press fit or a cross pin (not shown). The lower end of the shaft 23 is provided with a collar 29 which is fixedly secured in place by a cross pin 30 and serves to hold the rotatable frame 20 against downward displacement with respect to the shaft. The central portion of the cross pin 30 extends through a horizontally extending diametric hole 31 in the lower end of the shaft 23, and the ends of the cross pins extend through horizontal diametrically opposite holes 32 in the collar 29. Generally speaking, the mounting structure 19 is rigid and of unitary character.

The vertically elongated frame 20 is supported by the mounting structure 19 for rotation or turning movement about a vertical axis and consists of a vertically extending sleeve 33, a horizontally extending top plate 34, a horizontally extending bottom plate 35 and a plurality of vertically extending screw threaded rods 36. The sleeve 33 extends loosely around the shaft 23 of the mounting structure 19 in order that the frame 20 is free to rotate relatively to the shaft. The upper end of the sleeve 33 fits snugly in a hole 37 in the central portion of the top plate 34 and the lower end of the sleeve fits snugly in a hole 38 in the central portion of the bottom plate 35. The top and bottom plates 34 and 35 are preferably triangular so far as contour or configuration is concerned and are arranged in registering relation. The central portion of the bottom plate 35 rests on, and is supported by, the collar 29 on the lower end of the shaft 23. Such collar as previously pointed out holds the frame 20 against downward displacement with respect to the mounting structure. The frame is held against upward displacement with respect to the mounting structure by way of a collar 39 which surrounds the upper end of the shaft 23 and is interposed between the central portion of the arcuate bracket 22 and the central portion of the top plate 34. The vertically extending screw threaded rods 36 are preferably three in number. They may, however, be more or less in number than three depending upon how many different levels the indicator as a whole is to indicate. The upper ends of the rods 36 fit snugly within holes 40 in the corner portions of the top plate 34 and the lower ends of the rods fit snugly within holes 41 in the corner portions of the bottom plate 35. As shown in the drawings, the rods are screw threaded throughout the length thereof except for their extremities. The top and bottom plates of the frame 20 are of such size and the mounting structure 19 is so arranged or positioned that when the frame is positioned as shown in Figures 2 and 4 of the drawings, one of the rods 36 is located below and inwards of the filling opening 13 in the top wall of the tank to the end that it is readily visible from above when the cover 17 is in its open position, and the other two screw threaded rods are located or positioned beneath and outwards of the filling opening and hence are not readily visible through the filling opening when the cover is in its open position. It is contemplated that when it is desired to bring either of the other two rods into a readily visible position, the frame 20 will be turned in one direction or the other throughout a 120° arc depending upon which of the other rods is to be viewed from above.

In addition to the parts heretofore mentioned, the indicator comprises a detent arrangement for frictionally but releasably holding the frame 20 in the three different angular positions into which it is turned for rod viewing purposes. Such arrangement comprises a ball 42 which is mounted for vertical sliding movement in the upper end of a vertically extending open top but closed bottom hole 43 in the outer marginal portion of the collar 29 on the lower end of the shaft 23. The ball 42 is urged upwards toward the bottom plate 35 of the frame 20 by way of a spiral compression spring 44. The lower end of the spring abuts against the closed bottom of the hole 43 and the upper end of the spring seats or bears against the lower portion of the ball. The bottom surface of the bottom plate 35 is provided with three hemispherical sockets 45 and these are spaced 120° apart and are located the same distance from the axis of the shaft 23 as the ball 42. The sockets are so angularly arranged or positioned that one of them is disposed over, and receives the upper portion of, the ball 42 when the frame is turned so that one of the screw threaded rods 36 is in a viewable position as shown in Figures 2 and 4 of the drawings. When the frame is turned to bring one of the other rods into a fully viewable position, the ball is automatically depressed for frame releasing purposes until the hemispherical socket for the other rod is swung or turned into overlying relation with it. At such time the ball is urged upwards and coacts with the superjacent socket frictionally but releasably to hold the frame in place.

The nut type markers 21 of the indicator correspond in number to, and are associated respectively with, the vertically extending screw threaded rods 36 and are adapted to indicate different levels and hence amounts of whatever petroleum product is carried in the tank 9 of the vehicle 7. They consist of circular downwardly dished or convexo-concavo bodies 46 and internally threaded hubs 47. The hubs of the markers extend around, and are in screw threaded relation with, the rods 36 and cause the markers in connection with turning thereof relatively to the rods to move upwards or downwards depending upon the direction of turning movement. By turning the markers in one direction, they may be adjusted upwards and by turning the markers in the opposite direction they may be adjusted downwards. The internally threaded hubs 47 of the markers 21 are surmounted by lock nuts 48. The latter extend around the rods 36 and are adapted when tightened to lock the markers in their different or various adjusted positions. When it is desired to adjust the markers with respect to the rods, the lock nuts are loosened. It is contemplated that the markers will be vertically adjusted so that they are at different elevations in order that they serve to indicate different levels of whatever petroleum product is contained or carried in the tank of the vehicle. The outer marginal portion of the bodies 46 of the nut type markers 21 are provided with annular series of equidistantly spaced holes 49. In order to seal the markers in the various positions into which they are adjusted, each marker is provided with a wire and lead sealing device 50 consisting of a wire 51 in loop form and a lead piece 52 for securing the ends of the wire 51 together. The wires 51 of the devices 50 are adapted to extend through certain of the holes 49 in the outer marginal portions of the bodies 46 of the markers and are also adapted to extend around the sleeve 33 as shown in Figures 3 and 6 of the drawings. After a marker has been adjusted to the proper elevation, it is sealed in place by inserting the wire of the associated sealing device 50 through the hole 49 that is nearest the sleeve 33. Thereafter the end portions of the wire are manipulated around opposite sides of the sleeve and the extremities of the wire are secured together by the lead piece 52. When the devices 50 are in their operative or marker sealing position, they prevent the markers from being turned relatively to the rods 36. In order again to adjust the markers it is necessary that the lead pieces 52 be broken so as to release the ends of the wires 51.

The indicator also comprises a plurality of soft metal quantity indicating plates 53. The latter are flat and correspond in number to, and are associated respectively with, the vertically extending screw threaded rods 36 of the rotatable frame 20. They are located on the corner portions of the top surface of the top plate 34 and are secured in place by vertically extending screws 54. Preferably, the quantity indicating plates are triangular and there are two screws 54 for each plate. The screws 54 are arranged so that the heads thereof are at the top. The shanks of the screws extend downwards through holes 55 in certain of the corner portions of the plates 53 into screw threaded holes 56 in the subjacent portions of the top plate 34 of the frame 20. The heads of the screws 54 are provided with transversely extending holes 57. Associated with each set of two screws is a wire and lead sealing device 58 consisting of a wire 59 and a lead piece 60. The wire 59 of each device is adapted to extend through the holes in the heads of the set of screws with which the device is associated and is adapted after being threaded through the holes to have its ends connected together by the lead piece 60 of the device. When the devices 58 are in their operative positions, they serve to seal the three sets of screws 54 against turning and thus form seals for the quantity indicating plates 53. Each plate 53 is adapted to have stamped in it the number of gallons for which the subjacent marker is set or adjusted to indicate.

Assuming that the tank variety vehicle 7 is to be used in intrastate commerce or transportation only and is to be used periodically to transport or haul gasoline, kerosene and fuel oil and according to the weight laws and regulations of the State in which the vehicle is to be used the axle weight load of the vehicle is the maximum when the tank is filled with 1,000 gallons of gasoline, the indicator is set by first turning the frame so that one of the rods 36 is in its full view position as shown in Figures 2 and 4. Thereafter, the marker 21 for the one rod is adjusted towards the top of the rod and until it is at an elevation corresponding to the top level of 1,000 gallons of gasoline in the tank 9. As soon as the marker is properly adjusted the official of the Department of Weights and Measures having jurisdiction of the vehicle seals the marker in place by way of one of the wire and lead sealing devices 50. After sealing of the marker the official stamps on the superjacent quantity indicating plate 53 the legend "1,000 Gals." and seals such plate in place by one of the wire and lead sealing devices 58. After the one marker is set and sealed in place, the frame 20 is rotated throughout an arc of 120° in order to bring into full view position the second rod 36 the marker on which is to indicate the full load capacity of the tank when the latter is filled with kerosene. Because kerosene has a higher specific gravity than gasoline, the marker on the second rod is adjusted to a lower elevation than the marker that indicates when the tank is filled with 1,000 gallons of gasoline. The weight of 913 gallons of kerosene is approximately equal to the the weight of 1,000 gallons of gasoline. Therefore, the marker on the second rod is adjusted to an elevation corresponding to the level of 913 gallons of kerosene in the tank of the vehicle. After proper adjustment of the marker on the second rod, the official of the Department of Weights and Measures of the State having jurisdiction of the vehicle seals the marker in place by another of the wire and lead sealing devices 50 and then marks the superjacent quantity indicating plate 53 with the legend "913 Gals." and seals the screws for the plate by way of one of the wire and lead sealing devices 58. After the marker on the second rod is set and sealed in place, the frame 20 is rotated throughout another arc of 120° in order to bring into full view position the third rod 36 the marker on which is to indicate a full load capacity of the tank when the latter is filled with fuel oil. Because fuel oil has a higher specific gravity than kerosene, the marker on the third rod is adjusted to a lower elevation than the marker that indicates when the tank is filled with 913 gallons of kerosene. The weight of 852 gallons of fuel oil is approximately equal to the weight of 1,000 gallons of gasoline or 913 gallons of kerosene. Therefore, the marker on the third rod is adjusted to an elevation corresponding to the level of 852 gallons of fuel oil in the tank of the vehicle. After proper adjustment of the marker on the third rod, the official of the Department of Weights and Measures of the State having jurisdiction of the vehicle seals the marker in place by the third wire and lead sealing device 50 and then marks or stamps the superjacent quantity indicating plate 53 with the legend "852 Gals." and seals the screws for such plate by way of the third wire and lead sealing device 58. When the three markers of the indicator are set and sealed as heretofore pointed out, the first adjusted marker will indicate when the tank is filled with 1,000 gallons of gasoline, the second adjusted marker will indicate when the tank is filled with 913 gallons of kerosene and the third adjusted marker will indicate when the tank is filled with 853 gallons of fuel oil. Thus by using the three markers in connection with periodic or intermittent use of the tank with gasoline, kerosene or fuel oil, the operator will not overload the tank so that the axle weight load of the vehicle is in excess of the legal maximum as comprehended by the laws or regulations of the State having jurisdiction of the vehicle. It is, of course, contemplated that when the tank is to carry gasoline, the marker under the plate bearing the legend "1,000 Gals." will be used; when the tank is to haul or carry kerosene the marker under the plate 53 with the legend "913 Gals." will be used; and when the tank is to haul fuel oil the marker under the quantity indicating plate bearing the legend "852 Gals." will be used. The three markers are selectively brought into full view position by turning or rotating the frame 20 as hereinbefore indicated.

If the vehicle 7 is to be used in interstate commerce to carry but one kind of fuel, such for example, as gasoline and the States in which the vehicle is to travel have different maximum axle weight loads, 1,000 gallons in one State, 950 gallons in another State and 900 gallons in a third State, one of the markers will be set and sealed at a height corresponding to a 1,000 gallon level and the superjacent quantity indicating plate will be marked with the plate "1,000 Gals.," the second marker will be set and sealed at a height corresponding to the level of 950 gallons of gasoline and the superjacent plate 53 will be marked with the legend "950 Gals.," and the third marker will be set and sealed at a height corresponding to the level of 900 gallons of gasoline and the superjacent plate 53 will be marked with the legend "900 Gals." When the three markers are so set and sealed the operator of the vehicle can adjust the quantity of gasoline in the tank 9 so that it does not exceed the maximum permissible weight comprehended by the weight laws or regulations of the State in which the vehicle is at the time travelling.

The herein described multiple level indicator due to the fact that the markers are mounted individually on the vertically extending rods forming parts of a rotatable frame may be read with facility and readily brought into full view position by proper turning of the frame. Because of the particular construction and arrangement of parts, the indicator may be adjusted in a simple manner and produced at a comparatively low cost. The particular sealing devices for the markers 21 and the quantity indicating plates 53 make the indicator tamperproof after it is adjusted and sealed by the official of the Department of Weights and Measures having jurisdiction over the vehicle to which the indicator is applied.

Whereas the indicator has been described as embodying three screw threaded rods 36, it is to be understood that more or less rods may be employed depending upon the use to which the tank variety vehicle is put. It is also to be understood that the invention is not to be limited to the particular details set forth since these may be modified within the scope of the appended claims without departing from the spirit and scope of the invention.

This application is a continuation of application Serial No. 448,324, filed by me on August 6, 1954 now abandoned.

Having thus described the invention what I claim as new and desire to secure by Letters Patent is:

1. In combination with a tank variety vehicle having a filling opening in the top of the tank thereof, a multiple level indicator disposed directly beneath the top of the tank and at one side of the filling opening and comprising a mounting structure provided with means whereby it is attached to the superjacent portion of the top of the tank, a frame mounted on the mounting structure so as to rotate about a vertical axis, embodying a plurality of vertically extending fixedly mounted rods in spaced apart relation with one another and said vertical axis, arranged so that normally one rod is in a full view position wherein it is visible from above through the filling opening and the other rods are disposed under the top of the tank, and adapted in connection with back and forth rotation thereof selectively to bring any of the rods into its full view position, and level indicating markers corresponding in number to, and associated respectively with, the rods and mounted on said rods so that they are adjustable vertically relatively thereto.

2. In combination with a tank variety vehicle having a filling opening in the top of the tank thereof, a multiple level indicator disposed directly beneath the top of the tank and at one side of the filling opening and comprising a mounting structure provided with means whereby it is attached to the superjacent portion of the top of the tank, a frame mounted on the mounting structure so as to rotate about a vertical axis, embodying a plurality of vertically extending fixedly mounted screw threaded rods in spaced apart relation with one another and side vertical axis, arranged so that normally one rod is in a full view position wherein it is visible from above through the filling opening and the other rods are disposed under the top of the tank, and adapted in connection with back and forth rotation thereof selectively to bring any of the rods into its full view position, and nut type level indicating markers corresponding in number to, and mounted respectively on, the rods, adapted to be vertically adjusted by turning them relatively to the rods, and provided with releasable means for retaining them in their various adjusted positions on the rods.

3. In combination with a tank variety vehicle having a filling opening in the top of the tank thereof, a multiple level indicator disposed directly beneath the top of the tank and at one side of the filling opening and comprising a mounting structure provided with means whereby it is attached to the superjacent portion of the top of the tank, a frame mounted on the mounting structure so as to rotate about a vertical axis, embodying a plurality of vertically extending rods in spaced apart relation with one another and said vertical axis, arranged so that normally one rod is in a full view position wherein it is visible from above through the filling opening and the other rods are disposed under the top of the tank, and adapted in connection with back and forth rotation thereof selectively to bring any of the rods into its full view position, level indicating markers corresponding in number to, and associated respectively with, the rods and mounted on the rods so that they are adjustable vertically relatively thereto, and a spring biased detent arrangement extending between the mounting structure and the frame and operative frictionally but releasably to retain said frame in any selected rotative position wherein one of the rods is in its said full view position.

4. In combination with a tank variety vehicle having a filling opening in the top of the tank thereof, a multiple level indicator disposed directly beneath the top of the tank and at one side of the filling opening and comprising a mounting structure consisting of a bracket with means whereby it is attached to the superjacent portion of the top of the tank and a vertical depending shaft with its upper end fixedly connected to the bracket, a vertically elongated frame mounted on, and to rotate about, the shaft and embodying a horizontal top plate having in the central portion thereof a hole through which the upper end of the shaft extends loosely, a horizontal bottom plate positioned beneath and in spaced relation with the top plate and having in its central portion a hole through which the lower end of the shaft extends loosely, and a plurality of vertical rods extending between, and having the ends thereof connected to, the outer portions of the top and bottom plates and positioned in spaced apart relation with one another and said shaft, said frame being arranged so that normally one rod is in a full view position wherein it is visible from above through the filling opening and the other rods are disposed under the top of the tank and being adapted in connection with back and forth rotation thereof selectively to bring any of the rods into its full view position, and level indicating markers corresponding in number to, and associated respectively with, the rods and mounted on the rods so that they are adjustable vertically relatively thereto.

5. In combination with a tank variety vehicle having a filling opening in the top of the tank thereof, a multiple level indicator disposed directly beneath the top of the tank and at one side of the filling opening and comprising a mounting structure consisting of a bracket with means whereby it is attached to the superjacent portion of the top of the tank and a vertical depending shaft with its upper end fixedly connected to the bracket, a vertically elongated frame mounted on, and to rotate about, the shaft and embodying a vertical sleeve extending loosely around the shaft, a horizontal top plate having the central portion thereof connected to the upper end of the sleeve, a horizontal bottom plate positioned beneath and in spaced relation with the top plate and having its central portion connected to the lower end of said sleeve, and a plurality of vertical screw threaded rods extending between, and having the ends thereof connected to, the outer portions of the top and bottom plates and positioned in spaced apart relation with one another and said sleeve, said frame being arranged so that normally one rod is in a full view position wherein it is visible from above through the filling opening and the other rods are disposed under the top of the tank and being adapted in connection with back and forth rotation thereof selectively to bring any of the rods into its full view position, and nut type level indicating markers corresponding in number to, and mounted respectively on, the rods and adapted to be vertically adjusted by turning them relatively to the rods.

6. In combination with a tank variety vehicle having a filling opening in the top of the tank thereof, a multiple level indicator disposed directly beneath the top of the tank and at one side of the filling opening and comprising a mounting structure consisting of a bracket with means whereby it is attached to the superjacent portion of the top of the tank and a vertical depending shaft with its upper end fixedly connected to the bracket and its lower end provided with a fixed collar, a vertically elongated frame mounted on, and to rotate about, the shaft and embodying a horizontal top plate having in the central portion thereof a hole through which the upper end of the shaft extends loosely, a horizontal bottom plate positioned beneath and in spaced relation with the top plate and having its central portion supported rotatably on the collar and provided with a hole through which the lower end of the shaft extends loosely, and a plurality of vertical rods extending between, and having the ends thereof connected to, the outer portions of the top and bottom plates and positioned in spaced apart relation with one another and said shaft, said frame being arranged so that normally one rod is in a full view position wherein it is visible from above through the filling opening and the other rods are disposed under the top of the tank and being adapted in connection with back and forth rotation thereof selectively to bring any of the rods into its full view position, level indicating markers corresponding in number to, and associated respectvely with, the rods and mounted on the rod so that they are adjustable vertically relatively thereto, and a detent arrangement extending between the collar and the bottom plate and operative frictionally but releasably to retain the frame in any selected rotative position wherein one of the rods is in its said full view position.

7. In combination with a tank variety vehicle having a filling opening in the top of the tank thereof, a multiple level indicator disposed directly beneath the top of the tank and at one side of the filling opening and comprising a mounting structure consisting of a bracket with means whereby it is attached to the superjacent portion of the top of the tank and a vertical depending shaft with its upper end fixedly connected to the bracket, a vertically elongated frame mounted on, and to rotate about, the shaft and embodying a horizontal top plate having in the central portion thereof a hole through which the upper end of the shaft extends loosely, a horizontal bottom plate positioned beneath and in spaced relation with the top plate and having in its central portion a hole through which the lower end of the shaft extends loosely, and a plurality of vertical screw threaded rods extending between, and having the ends thereof connected to, the outer portions of the top and bottom plates and positioned in spaced apart relation with one another and said shaft, said frame being arranged so that normally one rod is in a full view position wherein it is visible from above through the filling opening and the other rods are disposed under the top of the tank and being adapted in connection with back and forth rotation thereof selectively to bring any of the rods into its full view position, and nut type level indicating markers corresponding in number to, and mounted respectively on, the rods, and adapted to be vertically adjusted by turning them relatively to said rods, and provided in their outer portions with annular series of holes, and wire and lead sealing devices associated respectively with the markers, operative to seal said markers in their adjusted positions, and embodying wires in the form of loops and extending around the shaft and through the holes in the outer portions of the markers that are nearest said shaft.

8. In combination with a tank variety vehicle having a filling opening in the top of the tank thereof, a multiple level indicator disposed directly beneath the top of the tank and at one side of the filling opening and comprising a mounting structure consisting of a bracket with means whereby it is attached to the superjacent portion of the top of the tank and a vertical depending shaft with its upper end fixedly connected to the bracket, a vertically elongated frame mounted on, and to rotate about, the shaft and embodying a horizontal top plate having in the central portion thereof a hole through which the upper end of the shaft extends loosely, a horizontal bottom plate positioned beneath and in spaced relation with the top plate and having in its central portion a hole through which the lower end of the shaft extends loosely, and a plurality of vertical rods extending between, and having the ends thereof connected to, the outer portions of the top and bottom plates and positioned in spaced apart relation with one another and said shaft, said frame being arranged so that normally one rod is in a full view position wherein it is visible from above through the filling opening and the other rods are disposed under the top of the tank and being adapted in connection with back and forth rotation thereof selectively to bring any of the rods into its full view position, level indicating markers corresponding in number to, and associated respectively with, the rods and mounted on the rods so that they are adjustable vertically relatively thereto, and quantity indicating plates corresponding in number to the rods, mounted on the top plate directly over the rods respectively, and provided with sealable means for securing them in place.

9. In combination with a tank variety vehicle having a filling opening in the top of the tank thereof, a multiple level indicator disposed directly beneath the top of the tank and at one side of the filling opening and comprising a mounting structure consisting of a bracket with means whereby it is attached to the superjacent portion of the top of the tank and a vertical depending shaft with its upper end fixedly connected to the bracket, a vertically elongated frame mounted on, and to rotate about, the shaft and embodying a vertical sleeve extending loosely around the shaft, a horizontal top plate having the central portion thereof connected to the upper end of the sleeve, a horizontal bottom plate positioned beneath and in spaced relation with the top plate and having its central portion connected to the lower end of said sleeve, and a plurality of vertical screw threaded rods extending between, and having the ends thereof connected to, the outer portions of the top and bottom plates and positioned in spaced apart relation with one another and said sleeve, said frame being arranged so that normally one rod is in a full view position wherein it is visible from above through the filling opening and the other rods are disposed under the top of the tank and being adapted in connection with back and forth rotation thereof selectively to bring any of the rods into its full view position, nut type level indicating markers corresponding in number to, and mounted respectively on, the rods and adapted to be vertically adjusted by turning them relatively to the rods, and soft metal quantity indicating plates corresponding in number to the rods, mounted on the top plate directly over the rods respectively, and provided with sealable means for securing them in place.

10. In combination with a tank variety vehicle having a filling opening at the top of the tank thereof, a multiple level indicator disposed directly beneath the top of the tank and at one side of the filling opening and comprising a mounting structure consisting of a bracket with means whereby it is attached to the superjacent portion of the top of the tank and a vertical depending shaft with its upper end fixedly connected to the bracket and its lower end provided with a fixed collar, a vertically elongated frame mounted on, and to rotate about, the shaft and embodying a vertical sleeve extending loosely around the shaft, a horizontal top plate having the central portion thereof connected to the upper end of the sleeve, a horizontal bottom plate positioned beneath and in spaced relation with the top plate and having its central portion connected to the lower end of said sleeve and supported rotatably on the collar, and a plurality of vertical screw threaded rods extending between, and having the ends thereof connected to, the outer portions of the top and bottom plates and positioned in spaced apart relation with one another and said sleeve, said frame being arranged so that normally one rod is in a full view position wherein it is visible from above through the filling opening and the other rods are disposed under the top of the tank and being adapted in connection with back and forth rotation thereof selectively to bring any of the rods into its full view position, nut type level indicating markers corresponding in number to, and mounted respectively on, the rods, adapted to be vertically adjusted by turning them relatively to said rods, and provided in their outer portions with annular series of holes, a detent arrangement extending between the collar and the bottom plate and operative frictionally but releasably to retain the frame in any selected rotative position wherein one of the rods is in its said full view position, wire and lead sealing devices associated respectively with the markers, operative to seal said markers in their adjusted positions, and embodying wires in the form of loops and extending around the sleeve and through the holes in the outer portions of the markers that are nearest said sleeve, and quantity indicating plates corresponding in number to the rods, mounted on the top plate directly over the rods respectively, and provided with sealable means for securing them in place.

11. In combination with a tank variety vehicle having a filling opening in the top of the tank thereof, a multiple level indicator disposed directly beneath the top of the tank and at one side of the filling opening and comprising a mounting structure provided with means whereby it is attached to the superjacent portion of the top of the tank, a vertically elongated frame mounted on the mounting structure so that it is shiftable laterally back and forth, embodying a plurality of vertically extending rods in spaced apart relation with one another, arranged so that normally one rod is in a full view position wherein it is visible from above through the filling opening and the other rods are disposed under the top of the tank, and adapted in connection with back and forth shift thereof selectively to bring any of the rods into its full view position, and level indicating markers corresponding in number to, and associated respectively with, the rods and mounted on said rods so that they are adjustable vertically relatively thereto.

12. In combination with a tank variety vehicle having a filling opening in the top of the tank thereof, a multiple level indicator disposed directly beneath the top of the tank and at one side of the filling opening and comprising a mounting structure provided with means whereby it is attached to the superjacent portion of the top of the tank, a vertically elongated frame mounted on the mounting structure so that it is shiftable laterally back and forth, embodying a plurality of vertically extending rods in spaced apart relation with one another, arranged so that normally one rod is in a full view position wherein it is visible from above through the filling opening and the other rods are disposed under the top of the tank, and adapted in connection with back and forth shift thereof selectively to bring any of the rods into its full view position, level indicating markers corresponding in number to, and associated respectively with, the rods and mounted on said rods so that they are adjustable vertically relatively thereto, and a detent arrangement extending between the mounting structure and the frame and operative frictionally but releasably to retain the frame in any selected shifted position wherein one of the rods is in its said full view position.

13. In combination with a tank variety vehicle having a filling opening in the top of the tank thereof, a multiple level indicator disposed directly beneath the top of the tank and at one side of the filling opening and comprising a mounting structure provided with means whereby it is attached to the superjacent portion of the top of the tank, a vertically elongated frame mounted on the supporting structure so that it is shiftable laterally back and forth, embodying a plurality of vertically extending fixedly mounted screw threaded rods in spaced apart relation with one another, arranged so that normally one rod is in a full view position wherein it is visible from above through the filling opening and the other rods are disposed under the top of the tank, and adapted in connection with back and forth shift thereof selectively to bring any of the rods into its full view position, and nut type level indicating markers corresponding in number to, and mounted respectively on, the rods, adapted to be vertically adjusted by turning them relatively to the rods, and provided with releasable means for retaining them in their various adjusted positions on the rods.

14. In combination with a tank variety vehicle having a filling opening in the top of the tank thereof, a multiple level indicator disposed directly beneath the top of the tank and at one side of the filling opening and comprising a mounting structure provided with means whereby it is attached to the superjacent portion of the top of the tank, a vertically elongated frame mounted on the supporting structure so that it is shiftable laterally back and forth, embodying a plurality of vertically extending fixedly mounted screw threaded rods in spaced apart relation with one another, arranged so that normally one rod is in a full view position wherein it is visible from above through the opening and the other rods are disposed under the top of the tank, and adapted in connection with back and forth shift thereof selectively to bring any of the rods into its full view position, nut type level indicating markers corresponding in number to, and mounted respectively on, the rods, adapted to be vertically adjusted by turning them relatively to said rods, and provided on their outer portions with annular series of holes, and wire and lead sealing devices associated respectively with the markers operative to seal said markers in their adjusted positions, and embodying wires in the form of loops and extending through certain of the holes in the outer portions of the markers.

15. In combination with a tank variety vehicle having a filling opening in the top of the tank thereof, a multiple level indicator disposed directly beneath the top of the tank and at one side of the filling opening and comprising a unitary mounting structure provided with means whereby it is attached only to the superjacent portion of the top of the tank, a vertically elongated frame mounted on the mounting structure so that it is shiftable laterally back and forth, embodying a plurality of vertically extending fixedly mounted screw threaded rods in spaced apart relation with one another, arranged so that normally one rod is in a full view position wherein it is visible from above through the filling opening and the other rods are disposed under the top of the tank, and adapted in connection with back and forth shift thereof selectively to bring any of the rods into its full view position, nut type level indicating markers corresponding in number to, and mounted respectively on, the rods, adapted to be vertically adjusted by turning them relatively to the rods, and provided in their outer portions with annular series of holes, a detent arrangement extending between the mounting structure and the frame and operative frictionally but releasably to retain the frame in any selected shifted position wherein one of the rods is in its said full view position, and wire and lead sealing devices associated respectively with the markers, operative to seal said markers in their adjusted positions, and embodying wires in the forms of loops and extending through certain of the holes in the outer portions of said markers.

16. In combination with a tank variety vehicle having a filling opening in the top of the tank thereof, a multiple level indicator disposed directly beneath the top of the tank and adjacent to the filling opening and comprising a mounting structure embodying a horizontal bracket with means whereby it is attached to the superjacent portion of the top of the tank, a plurality of vertically extending rods positioned so that they depend from the bracket and are in spaced apart relation with one another, level indicating markers corresponding in number to, and associated respectively with, the rods, and mounted on said rods so that they are adjustable vertically relatively thereto, and quantity indicating plates corresponding in number to the rods, positioned adjacent to the upper ends of the rods respectively, and provided with sealable means for securing them in place.

17. In combination with a tank variety vehicle having a filling opening in the top of the tank thereof, a multiple level indicator disposed directly beneath the top of the tank and adjacent to the filling opening and comprising a mounting structure embodying a horizontal bracket with means whereby it is attached to the superjacent portion of the top of the tank, a plurality of fixed vertically extending screw threaded rods positioned so that they depend from the bracket and are in spaced apart relation with one another, nut type level indicating markers corresponding in number to, and mounted respectively on, the rods, and adapted to be vertically adjusted by turning them relatively to the rods, and quantity indicating plates corresponding in number to the rods, positioned adjacent to the upper ends of the rods respectively, and provided with sealable means for securing them in place.

18. In combination with a tank variety vehicle having a filling opening in the top of the tank thereof, a multiple level indicator disposed directly beneath the top of the tank and adjacent to the filling opening and comprising a mounting structure embodying a horizontal bracket with means whereby it is attached to the superjacent portion of the top of the tank, a plurality of fixed vertically extending screw threaded rods positioned so that they depend from the bracket and are in spaced apart relation with one another, nut type level indicating markers corresponding in number to, and mounted respectively on, the rods, adapted to be vertically adjusted by turning them relatively to the rods, and provided in their outer portions with annular series of holes, and wire and lead sealing devices associated respectively with the markers, operative to seal said markers in their adjusted positions, and embodying wires in the form of loops and extending through certain of the holes in the outer portions of the markers.

19. In combination with a tank variety vehicle having a filling opening in the top of the tank thereof, a multiple level indicator disposed directly beneath the top of the tank and adjacent to the filling opening and comprising a mounting structure embodying a horizontal bracket with means whereby it is attached to the superjacent portion of the top of the tank, a plurality of fixed vertically extending screw threaded rods positioned so that they depend from the bracket and are in spaced apart relation with one another, nut type level indicating markers corresponding in number to, and mounted respectively on, the rods, adapted to be vertically adjusted by turning them relatively to the rods, and provided in their outer portions with annular series of holes, wire and lead sealing devices associated respectively with the markers, operative to seal said markers in their adjusted positions, and embodying wires in the form of loops and extending through certain of the holes in the outer portions of the markers, and quantity indicating plates corresponding in number to the rods, positioned adjacent to the upper ends of the rods respectively, and provided with sealable means for securing them in place.

20. In combination with a tank variety vehicle having a filling opening in the top of the tank thereof, a level indicator disposed directly beneath the top of the tank and adjacent to the filling opening and comprising a mounting structure embodying a horizontal bracket with means whereby it is attached to the superjacent portion of the top of the tank, a vertically extending rod positioned so that it depends from the bracket, a level indicating marker mounted on the rod so that it is adjustable vertically relatively thereto, and a quantity indicating plate positioned adjacent to the upper end of the rod and provided with sealable means for securing it in place.

21. In combination with a tank variety vehicle having a filling opening in the top of the tank thereof, a level indicator disposed directly beneath the top of the tank and adjacent to the filling opening and comprising a mounting structure embodying a horizontal bracket with means whereby it is attached to the superjacent portion of the top of the tank, a fixed vertically extending screw threaded rod positioned so that it depends from the bracket, a nut type level indicating marker mounted on the rod, adapted to be vertically adjusted by turning it relatively to the rod, and provided in its outer portion with an annular series of holes, a wire and lead sealing device associated with the marker, operative to seal said marker in any of its adjusted positions, and embodying a wire in the form of a loop and extending through one of the holes in the outer portion of the marker, and a soft metal quantity indicating plate positioned adjacent to the upper end of the rod and provided with sealable means for securing it in place.

No references cited.